Jan. 30, 1934. E. RIEMENSCHNEIDER 1,945,077
METHOD OF MAKING WELDED AXLE HOUSINGS
Filed Oct. 7, 1930

Inventor
Ernest Riemenschneider
By Justin M. Macklin
Attorney

Patented Jan. 30, 1934

1,945,077

UNITED STATES PATENT OFFICE 1,945,077

METHOD OF MAKING WELDED AXLE HOUSINGS

Ernest Riemenschneider, Cleveland, Ohio, assignor to The Midland Steel Products Company, Cleveland, Ohio, a corporation of Ohio Application October 7, 1930. Serial No. 486,971

2 Claims. (Cl. 29—153.1)

This invention relates to a method of forming rear axle housings for motor vehicles and is an improvement in the method described in my copending application Serial No. 481,177, filed September 11, 1930, for formng axle housings from tubing.

As there described several methods of manufacturing such housings have been used, all of which are comparatively expensive either because the practice thereof involves a waste of material or requires considerable labor and expensive apparatus.

In one method, a tubing of comparatively large diameter is swaged down on each side of the center to form the axle housing portions, a portion at the center being retained at the original diameter. This large central portion is then slit longitudinally, spread open and formed into the gear housing portion. This method requires the use of expensive special equipment dies and the employment of skilled operators.

The other methods contemplate stamping blanks and shaping them into upper and lower halves of housings, and then welding the halves together along two longitudinal seams extending the full length of the housing. The exceedingly long weld required is expensive and, due to the irregular outline of the blank, a considerable percentage of the stock is wasted.

The next method reduced this waste by the use of quarter housing blanks, but this method required an additional weld across the gear housing portions.

In these methods quite often the apron flanges are separately formed and welded onto the finished housing or cast sleeves with apron ends are fitted thereon. When such separate parts are used, careful fitting of these parts of the housing is required to obtain the correct overall dimensions.

My method makes possible the manufacture of axle housings of better quality and of smoother contour than those produced by use of the present methods, and, at the same time effects a large savings in cost.

For instance, my method eliminates all waste of stock and, since the apron flanges are formed integral with the housing, greatly reduces the labor required.

Another advantage of my method is that it may be effectively practiced with standard mill equipment and dies, all of which may be put to numerous other uses when my method is not being practiced.

Another advantage of my method resides in the fact that by its practice housings of uniform high quality may be produced in a minimum of time.

Still another object of my process is that the various steps are comparatively simple and easy to apply so that expert or highly skilled labor need not be employed for applying it effectively.

The manner in which I accomplish these and other objects and advantages of my method will become apparent from the following specification in which reference is made to the drawing by the use of numerals, like numerals being used to designate the same parts in the various views.

In the drawing —

In carrying out the process of my copending application the ends of a length of tubing are upset in order to finish additional wall thickness for increasing the diameter of the tube preparatory to forming the central flange portion. In some cases this necessitates upsetting a comparatively long length of tubing. The process of the present application eliminates this upsetting operation and reduces the cost of manufacture, the remaining steps being substantially the same as described in my copending application.

Figure 3:
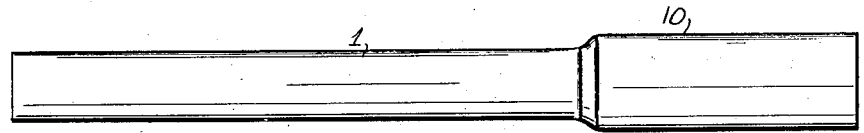
Fig. 3 is an elevation of a tube after the reducing operation of my process.

In carrying out the process of the present application I may use heated tubing. The section of tubing 1 of a diameter larger than the finished housing is swaged down or reduced in diameter as illustrated in Fig. 3, bringing the main body of the tubing to the desired small diameter of the finished housing and retaining an enlarged portion 10 at one end. The blank tube used is preferably of the same diameter as the portion 10 so that upsetting or swelling of the end portion will not be necessary. However, if the difference in diameter between the finished housing and the portion 10 is to be very great, a tube of intermediate size could be used, part of the tubing being reduced as described, and the portion 10 swelled or increased in diameter additionally.

Figure 4:
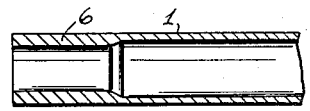
Fig. 4 is an elevation of the left end of the tube illustrated in Fig. 3 showing the upset for flanging.
Figure 5:
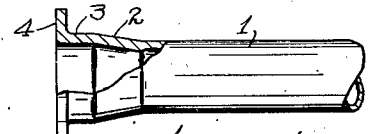
Fig. 5 is an elevation of the end of the tube illustrated in Fig. 4, showing the finished flange.

The left or small end of the tube is next placed in a suitable female die and forcibly engaged by a complementary male die to produce an upset, as illustrated in Fig. 4. This upset of stock furnishes the extra material required for the next operation. The upset end is engaged by suitable dies to spread outwardly to swell a portion thereof to form a frustro-conical portion 2 and an enlarged annular portion 3, the walls of which may be of greater thickness than the original tube to permit machining to a smooth finish, inside and out if desired. The end portion of the enlarged annular portion 3 is likewise engaged by dies which form it into a thickened flange 4 sufficiently heavy for securing the brake apron thereon by rivets, or otherwise.

Figure 6:
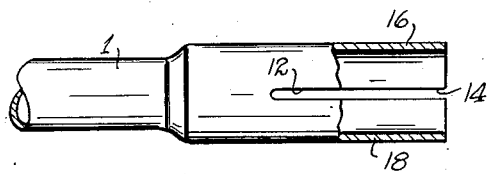
Figs. 6 and 7 are elevations partly in section illustrating successive steps in the forming of the central flanged portion of the housing.

The enlarged portion 10 is then slid over a suitable shoe or mandrel and engaged by knives or punches which slot it longitudinally, the slots indicated at 12 and 14 in Fig. 6 being diametrically opposite and dividing the end 8 into two sections 16 and 18.

Figure 7:
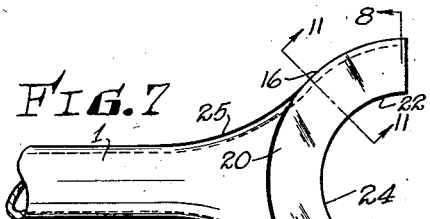
Figure 11:
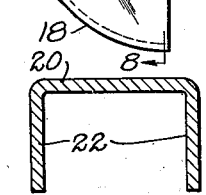
Fig. 11 is a cross sectional view of the central flange of the housing illustrated in Fig. 7 and is taken on a plane indicated by the line 11—11 on Fig. 7.

After the slotting operation, the tube is placed in a female die and engaged by a complementary die. These dies open the slot, spreading the sections 14 and 16 relatively apart, and form them into a large semi-circular housing portion integral with the tube, as indicated at 20, having a base portion 18 and side flanges 22, as illustrated in Figs. 7 and 11. Likewise, the adjacent portion 21 of the tube is given the desired shape so that the semi-circular portion gradually blends into the original tube.

Figure 9:
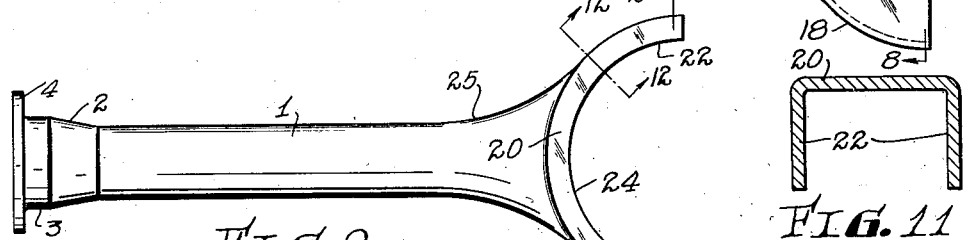
Fig. 9 is a side elevation of one-half of the finished housing.
Figure 12:
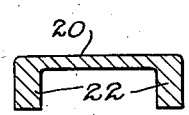
Fig. 12 is a cross sectional view of the central flange of the finished housing and is taken on a plane indicated by the line 12—12 of Fig. 9.
Figures 8, 10:
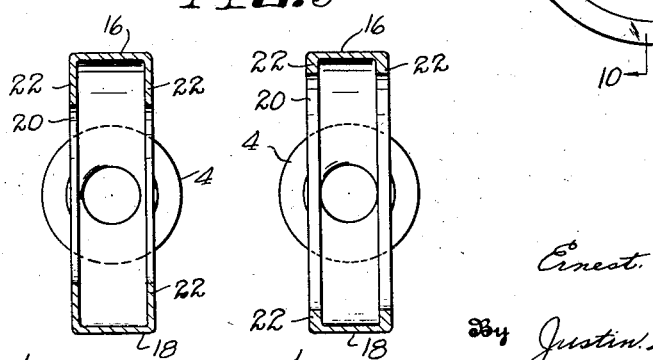
Fig. 8 is a cross sectional view of the partially formed housing illustrated in Fig. 7 and is taken on a plane indicated by the line 8—8 thereon.
Fig. 10 is a cross sectional view of the housing illustrated in Fig. 9 and is taken on a plane indicated by the line 10—10 on Fig. 9.

It should be noted that the flanges 22 of the semi-circular housing portion 20 are comparatively thin and wide, as better illustrated in Fig. 11, and that the semi-circular opening 24 which is defined by the new position and shape of the edges of the slots 12 and 14, is comparatively small. It is desirable that this opening be as large as possible and that the flanges 22 be comparatively heavy in order to furnish sufficient body for bolting the usual closure plates on the housing. Therefore, the tubing illustrated in Fig. 7 is next placed in a suitable upset die, and struck a heavy blow so as to upset the flanges 22. This die may also impart a final shape to the portion 25. This greatly increases the size of the opening 24, as illustrated in Figs. 9 and 10, and makes the flanges 22 comparatively narrow radially and very thick, as illustrated in Figs. 9 and 12, for the purposes above mentioned and to facilitate the welding, as will now be described.

The tube, being thus shaped and operated upon, comprises half of a complete housing and since the flanges 22 and base portion 18 are semi-circular, the formed tube and a similarly shaped tube may be placed with the ends of the semi-circular portions 20 abutting and the two sections butt welded or otherwise fastened together to form a complete rear axle housing, having integral apron flanges and enlarged diameters where required.

As is apparent, a relatively very small amount of welding is required, in fact, only the small channel shaped ends of the semi-circular portions, the length of which is about equal to the circumference of the original tube, need to be welded.

In this manner I eliminate a number of expensive separately formed parts and assembling operations and form a housing that is practically integral, requiring at most a slight surfacing of the flanges 4 for a tight fit of the brake aprons.

Figure 2:
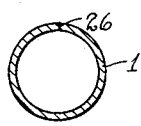
Fig. 2 is a cross sectional view of the tube illustrated in Fig. 1 taken on a plane indicated by the line 2—2 of Fig. 1.
Figure 1:
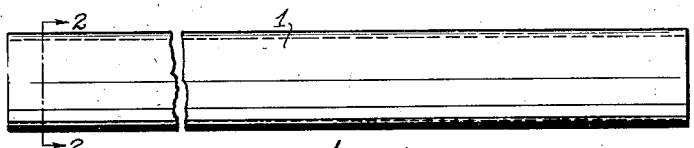
Fig. 1 is an elevation of a piece of stock tubing of the required length to form into a portion of housing by my process.

In this connection it should be noted that the tubing illustrated in Figs. 1 and 2 may be welded tubing formed from single strip and welded as indicated at 26 in Fig. 2. In such case the weld is preferably placed in a plane normal to the plane through slots 12 and 14.

In such case, the strip is heated to a comparatively high temperature when it leaves the welding apparatus, thus effecting a saving of heat and time which otherwise would be lost.

Further, while I have described a method of forming the tube into an integral half of a housing, obviously this is not necessary, as both the flange end to receive the brake drum and the central portion to receive the gears may be made on separate pieces of stock material and the stock butt welded intermediate these portions.

While in the above description of my invention I have specified that the ends of the two sections of tubing are butt welded by autogenous welding, I do not intend to limit myself to this one type of welding, but intend to include lap welding or welding with a fusible electrode or other methods of welding. Although I have illustrated my process as applied to circular tubing, obviously it may be applied to tubing of any desired cross section depending upon the shape required in the finished housing.

I claim:

1. A method of forming axle housings for motor vehicles, which consists of changing the relative diameters of a portion of each of two lengths of tubing to impart the proper length for a housing section and to form an enlarged end on each, upsetting the smaller end of the tubing to render the wall thickness thereof greater than the wall thickness of the original stock to bring the tubing to appropriate length, increasing the outside diameter of the upset portion intermediate the end and the remainder of the tubing gradually outwardly from the tubing while maintaining the thickness of said tapered portion greater than the stock, and turning the outer portion of the upset portion into a brake apron flange of greater thickness than the stock, and bifurcating the enlarged end and bending the bifurcated portions into outwardly extending arcuate forks of substantially U-shape cross section and securing together the members thus formed in end to end relation by welding the ends of the forks of one to the ends of the forks of the others.

2. The method of forming an axle housing consisting of reducing the diameter of a tube from a point adjacent one end throughout the balance of its length to lengthen the tube and to provide an enlarged end having wall thickness substantially equal to that of the reduced portion of the tube; providing said enlarged end with diametrically disposed slots extending longitudinally from the free enlarged end to points adjacent the medial parts of the enlarged portions to divide each enlarged end into a pair of arms of substantially U section, bending said arms into outwardly curved formation whereby they conjointly form a semi-circular forked end, assembling a pair of such tubes with the ends of the arms of the forked ends in abutment and longitudinal alignment, and butt-welding said ends together whereby they conjointly provide substantially circular openings in opposite sides of the finished housing.

ERNEST RIEMENSCHNEIDER.